United States Patent [19]

Holldorff

[11] 4,269,041

[45] May 26, 1981

[54] ABSORPTION REFRIGERATING MACHINE WITH STORAGE DEVICE FOR OPERATION WITH YIELD OF HEAT ENERGY AND REFRIGERATING REQUIREMENT DIFFERENT IN TIME

[75] Inventor: Günther Holldorff, Berlin, Fed. Rep. of Germany

[73] Assignee: Borsig GmbH, Berlin, Fed. Rep. of Germany

[21] Appl. No.: 109,636

[22] Filed: Jan. 4, 1980

[30] Foreign Application Priority Data

Jan. 4, 1979 [DE] Fed. Rep. of Germany ....... 2900388

[51] Int. Cl.³ .............................................. F25B 15/00
[52] U.S. Cl. ......................................... 62/476; 62/489
[58] Field of Search ................................... 62/476, 489

[56] References Cited

U.S. PATENT DOCUMENTS

| | | | |
|---|---|---|---|
| 2,169,214 | 8/1939 | Bergholm | 62/489 X |
| 2,182,453 | 12/1939 | Sellew | 62/489 X |
| 3,166,914 | 1/1965 | Hallatt | 62/476 X |
| 3,817,050 | 6/1974 | Alexander et al. | 62/476 X |

Primary Examiner—Lloyd L. King
Attorney, Agent, or Firm—Becker & Becker, Inc.

[57] ABSTRACT

An absorption refrigerating machine for operation encountering differences of heat energy and refrigeration requirement over a period of time. A storage unit for storing of refrigerating medium-fluid is provided in the flow direction of the refrigeration medium after the condenser for liquefying of refrigerating-medium-vapor; a storage unit for storing of weak refrigeration medium-solution is provided in the flow direction of the solution in a bypass conduit after the solution heat exchanger and the automatic expansion or relief valve. The bypass conduit is connected with a continuous line or conduit by two distributor valves, and a storage unit for storage of rich refrigeration medium-solution is located in the flow direction of the solution after the absorber. The relief valve as well as the distributor valves are in open and closed conditions for predetermined conditions of operation of heat energy and refrigeration requirement such that a single storage unit may be provided which has connections of the bypass conduit from one distributor valve and to another distributor valve located below for the specific heavier weak refrigeration medium-solution and above having the connections of a conduit from a pump and a solution pump for the specifically lighter rich refrigeration medium-solution.

7 Claims, 6 Drawing Figures

H: Heat energy
C: Cold Requirement
T: Time

ABSORPTION REFRIGERATING MACHINE WITH STORAGE DEVICE FOR OPERATION WITH YIELD OF HEAT ENERGY AND REFRIGERATING REQUIREMENT DIFFERENT IN TIME

The present invention relates to an absorption refrigerating machine for operation with yield of heat energy and refrigeration requirement differing in time.

The refrigeration from heat energy, preferably waste heat, is possible with absorption refrigeration machines and with compression refrigerating machines with drive by a Rankine-process, accordingly with the aid of an expansion power engine or prime mover (motor).

These methods are of interest with respect to regaining of energy, are economical, and most of all with absorption refrigerating plants are operationally and technically advantageous.

The application thereof, however, is difficult when the yield of heat energy in time does not coincide with the refrigeration requirement, especially when the heat energy is available only intermittently, though the refrigeration requirement continually exists. This is frequently the case in the chemical industry and in the food technology, for instance, with breweries, without being restricted thereto.

If the cold or refrigeration is also to be created or generated from heat energy with such operational conditions and requirements, it is accordingly necessary to store the cold or refrigeration created or generated during the heat periods; an economical storing of the waste heat is practically impossible. The methods corresponding to the state of the art for refrigeration storage have however considerable disadvantages:

With ice storage, the application is restricted to temperatures in the null or zero degree range. Storage means embodied from pipe or tube coils or plate systems are complex and have a considerable space requirement. For reduction of the refrigeration losses, such storage means must be insulated. A direct product cooling by the vaporized refrigeration medium is not possible; the ice water operates as a cold or refrigeration carrier and an ice water pump is necessary with corresponding energy requirement. The enlarged temperature gaps therewith between the vaporizing temperature and temperature of the product to be cooled worsen thermodynamically the cold or refrigeration process and increase the energy requirement of the refrigeration machine, and this is more so because in the course of the storage process, as a consequence of the increasing ice thickness, the vaporizing temperature must be lowered.

A similar situation is true and prevails for brine or salt water storage. Lower temperatures may also be possible in this connection, but with the lower temperatures there also rises considerably the complexity of insulating means if no increased cold or refrigeration losses are to be accepted. Since in contrast to the ice storage system only perceptible heat can be stored, large storage volumes are necessary. Somewhat more advantageous conditions exist with the utilization of eutectic brines or salts without, however, eliminating the basic disadvanatages. Also here no direct cooling of the product is possible, and the lowering of the vaporizing temperature is true still in a greater measure than with the ice storage if an economically feasible brine quantity is to be attained. The necessary brine pump has a considerable energy requirement.

It is an object of the present invention to improve the energy requirement situation by providing an absorption refrigerating machine with which, among other features, during the heating period there can be stored refrigerating medium-fluid and weak refrigerating medium-solution with which during the cooling or refrigerating period the provided refrigerating capability or output is maintained.

This object, and other objects and advantages of the present invention, will appear more clearly from the following specification in connection with the accompanying drawings, in which.

Figure 5:
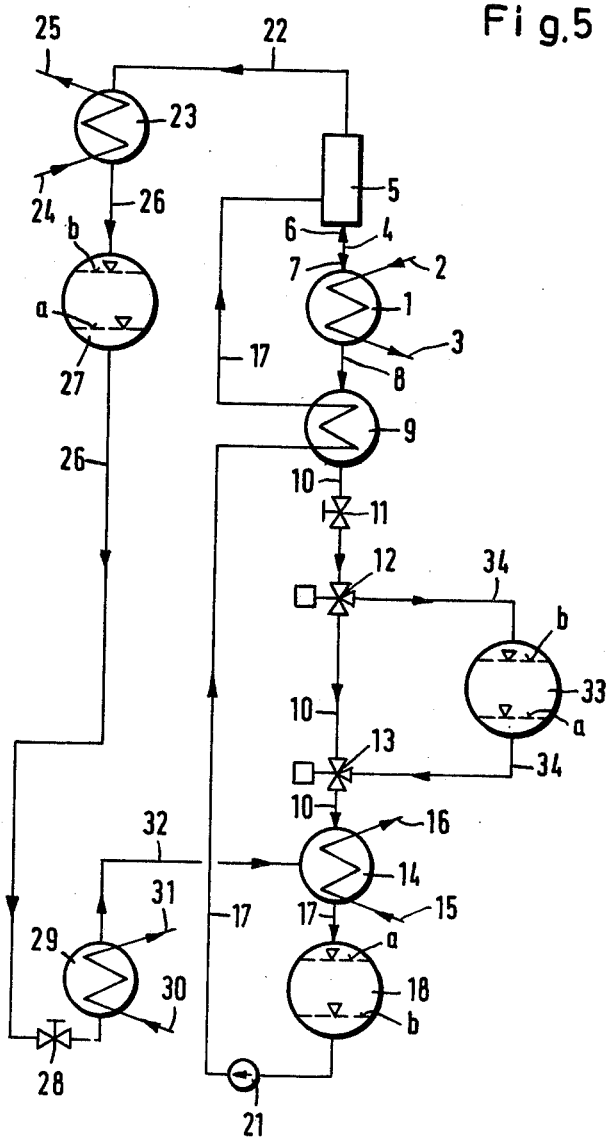
Figure 6:
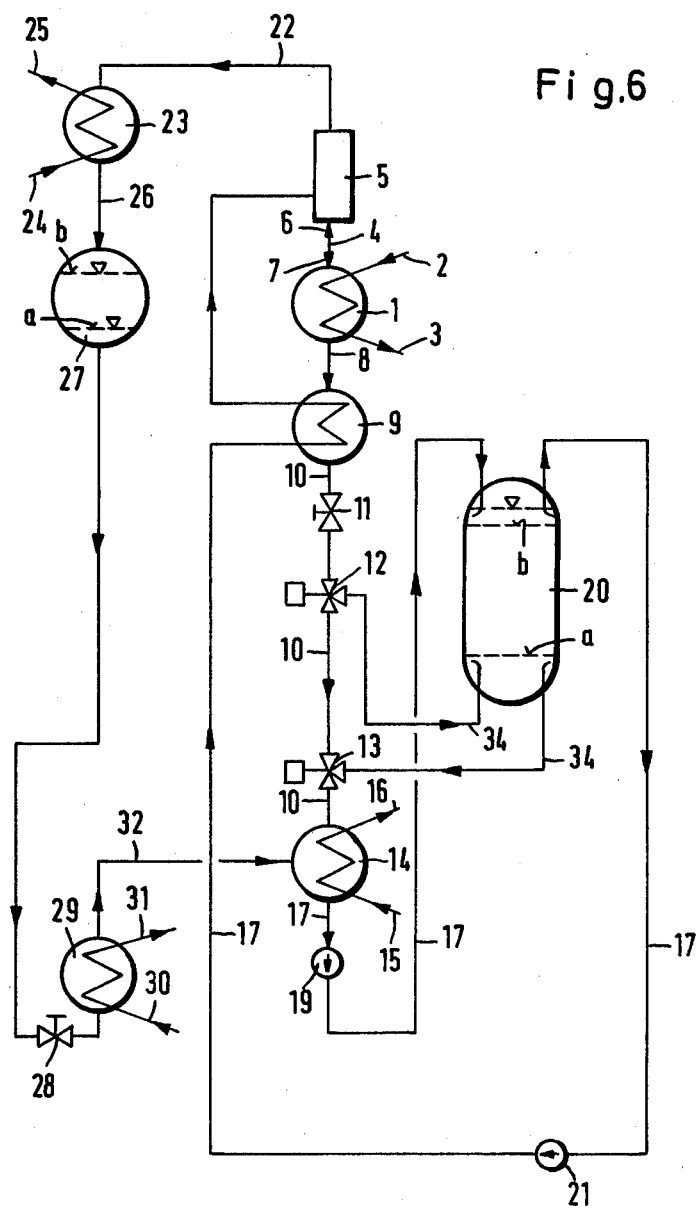

FIG. 5 is a schematic representation of the principle of an absorption refrigeration machine with a respective storage means for refrigeration-medium fluid, weak and rich refrigeration-medium solution; and FIG. 6 shows such a schematic representation of the principle with which, however, for two differing specific weight solutions—weak and rich refrigeration—medium solutions only one storage means is provided.

The absorption refrigerating machine of the present invention is characterized primarily in that in the flow direction of the refrigerating medium, after the condenser for liquefying refrigerating medium-vapor, a storage means is provided for storing refrigerating medium-fluid; and in the flow direction of the solution, after the solution heat exchanger and the automatic expansion or relief valve, in a bypass conduit, a storage means is provided for storing weak refrigerating medium-solution. The bypass conduit, at both ends thereof, is connected with the continuous pipe or conduit by two distributor valves. The invention is further characterized in that, in the flow direction of the solution, after the absorber, a storage means is located for storing rich refrigerating medium-solution.

During sole yield or availability of heating energy without refrigeration requirement, according to a further embodiment of the present invention, the automatic expansion or relief valve, which in the direction of flow of refrigerating medium is located after the storage means for refrigerating medium-fluid, is closed, the first distributor valve, which is arranged in the direction of flow of the weak refrigeration medium-solution, is alone opened from the line or conduit from the solution heat exchanger to the bypass conduit, and the second distributor valve is closed from the storage means for the weak refrigeration medium-solution to the continuous conduit and further to the absorber.

When encountering refrigeration requirement solely without heat energy, inventively the automatic expansion valve, located in the direction of flow of the refrigerating medium after the storage means for the refrigerating medium-fluid, and the distributor valve from the bypass conduit of the storage means for the weak refrigerating medium-solution to the continuous conduit and further into the absorber, are opened and the first distributor valve, which is arranged in the flow direction of the weak refrigeration medium solution, is closed from the conduit from the solution heat exchanger with respect to both discharge or flowing-off directions.

If with uniform supply of heat energy load peaks of refrigeration requirement are to be covered, then according to the present invention, with filled storage means for refrigeration medium-fluid and for the weak refrigeration medium-solution, the automatic expansion or relief valve, which is located in the flow direction of the refrigeration medium after the storage means for the refrigeration medium-fluid, and both distributor valves, from the continuous conduit from the solution heat exchanger to the absorber and from the continuous conduit from the solution heat exchanger to the bypass conduit through the storage means for the weak refrigeration medium-solution and further to the absorber, are opened.

If refrigeration requirement and silultaneously a yield of excessive heat energy are given, according to a further embodiment of the present invention, with partially filled storage means for the refrigeration medium-fluid and the weak refrigeration medium-solution, the automatic relief or expansion valve, which is located in the direction of flow of the refrigeration medium after the storage means for refrigeration medium-fluid, and both distributor valves, from the continuous conduit from the solution heat exchanger to the absorber and the distributor valve from the continuous conduit from the solution heat exchanger to the bypass conduit into the storage means for the weak refrigeration medium-solution, are opened, and the distributor valve from the bypass conduit from the storage means for weak refrigerating medium solution to the continuous conduit and further to the absorber is closed.

For the purpose of reducing the volume of weak refrigeration medium-solution and, accordingly, reducing the size of the storage means for the weak refrigeration medium-solution by reduction of the refrigerating medium concentration in the weak refrigeration medium-solution, inventively, during increased supply of heat to the expeller, the automatic expansion or relief valve located in the direction of flow of the refrigeration medium after the storage means for refrigeration medium-fluid is closed, the distributor valve from the continuous conduit from the solution heat exchanger alone to the bypass conduit into the storage means for the weak refrigeration medium solution is opened, and the distributor valve from the bypass conduit from the storage means for weak refrigeration medium-solution to the continuous conduit and further to the absorber is closed.

For further cost reduction, economy, and saving as to the storage space, there is provided according to the present invention a single storage means for the storage of weak and rich refrigeration medium-solution; this single storage means at the bottom provides the connections of the bypass conduit from the first distributor valve, which is arranged in the flow direction of the weak refrigeration medium-solution and to the second distributor valve for the specifically heavy weak refrigeration medium-solution, and at the top provides the connections of the conduit from the absorber by way of a pump for conveying rich refrigeration medium-solution into the storage means and from the storage means to a solution pump for the specifically light rich refrigeration medium-solution.

The advantages attained with the present invention consist especially thereof: that by way of the storage means for refrigeration medium-fluid, weak and rich refrigeration medium-solution, the refrigeration or cold generation is assured, even when no heat energy or only insufficient heat energy is encountered in time periods; that through the storage of refrigeration medium-fluid there is provided a mediate or indirect cold or refrigeration storage in the entire temperature range of the absorption refrigerating machine, for instance, with ammonia as refrigerating medium between $+60°$ C. and $0°$ C.; that through direct cooling of the product to be cooled without intermediate connection of a refrigeration carrier, no increased temperatures arise between the vaporizing temperature and the product temperature; that the absorption refrigerating machine during the heating period operates uniformly with the same operating parameters as during cooling, accordingly not showing any worsened heat relationship; that the storage of the three medium occurs independently of the vaporizing temperature of the refrigeration medium-fluid at environmental temperature, for which purpose then no insulation of the storage means is necessary, since no cold or refrigeration losses can arise, whereby the storage of the said three mediums can be maintained for an unlimited length of time (a giving off of heat from one or from all three stored mediums to the possibly colder environment can only be useful for the efficiency of the absorption refrigerating machine); and that the high vaporizing heat of, for instance, ammonia as refrigerating medium leads to a small storage volume for the refrigeration medium-fluid and that also the volume of the weak refrigeration medium-solution to be stored, though a multiple of the quantity of fluid ammonia, is considerably smaller than for instance the necessary storage volume required with refrigeration storage by means of brine.

Figure 1:
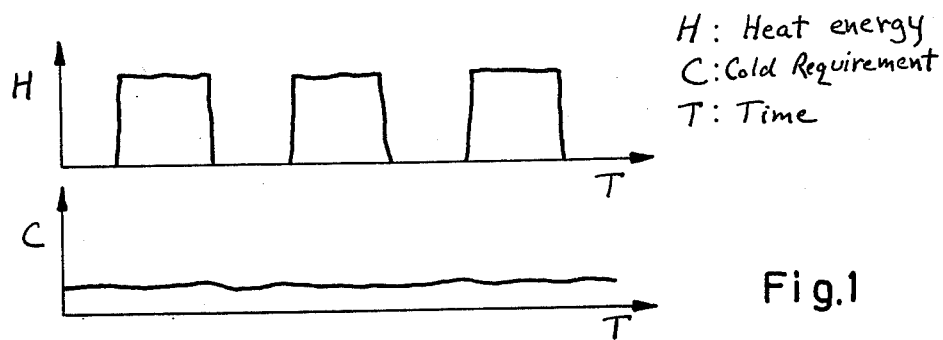
FIG. 1 is a graphic representation of the heat energy and refrigeration requirement as a function of time, with intermittent yield of heat energy at substantially continuous refrigeration requirement.
Figure 2:
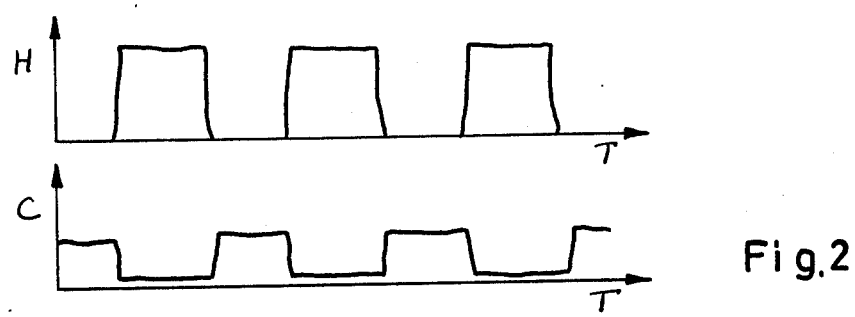
FIG. 2 is a graphic representation of the heat energy and refrigeration requirement as a function of time, with intermittent yield of heat energy at intermittent, though time-shifted, refrigeration requirement.
Figure 3:
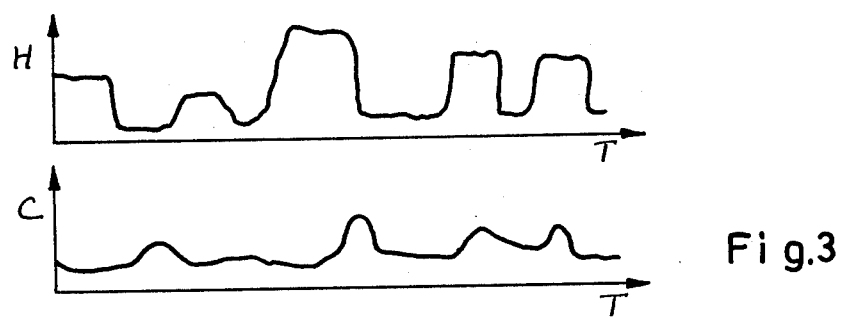
FIG. 3 is a graphic representation of the heat energy and refrigeration requirement as functions of time, with changes of yield of heat energy and refrigeration requirement independently of each other in broad limits.
Figure 4:
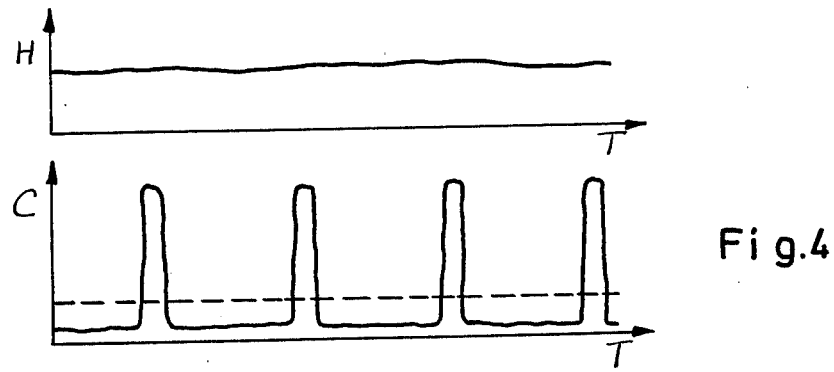
FIG. 4 is a graphic representation of the heat energy and the refrigeration requirement as functions of time, with approximately constant yield of heat energy at refrigeration requirement with periodically short, but high load peaks.

Reference will now be made to the drawings in detail. For the interrelationships between the yield or availability of heat energy and refrigeration requirement, the following basic possibilities exist:

Intermittent yield of heat energy with substantially continuous refrigeration requirement (FIG. 1);

Intermittent yield of heat energy with intermittent, though timely shifted refrigeration requirement (FIG. 2);

Changing of the yield of heat energy and refrigeration requirement independently of each other in broad limits (FIG. 3); and Approximately constant yield of heat energy at refrigeration requirement with periodic short but high load peaks, whereby the momentarily required peak refrigeration capacity can amount to a multiple of the average refrigeration capacity or output which would result if the refrigeration capacity or output were uniform over the entire period corresponding to the dotted line (FIG. 4). Because of the aforementioned disadvantages of the known refrigeration storage means, there can be eliminated for this situation the periodic short load peaks of the refrigeration requirement upon a refrigeration storage, and a compression refrigeration machine is installed which must be embodied for the peak load capacity or output for which it operates in the remaining time in low or deep partial load range, accordingly being utilized poorly.

All operational situations are covered inventively within the framework of the aforementioned basic possiblities. There must only be fulfilled the requirement that over the entire operating period the sum of the heat energy available is sufficient for the generation of the sum of refrigeration requirement needed in the same time period or time interval.

An absorption refrigeration machine embodied according to the present invention can be operated continuously with an output or capacity which corresponds to the average load. The continuous excess of refrigeration above the basic load requirement is stored in the form of refrigeration medium-fluid and weak refrigeration medium-solution, and is available for the load peaks. In contrast to the compression refrigeration machine, the entire system need not be designed for peak load capacity, but rather only the vaporizer and the absorber. Expeller, separating column, condenser, solution heat exchanger, pump for the solution, etc., are dimensioned only for the considerably smaller capacity or output.

The present invention builds or improves upon a previously known absorption refrigerating machine operating continuously in a process, and reference can be made to the known components in FIGS. 5 and 6, aside from which the novel inventive features are represented.

In normal operation of the absorption refrigeration machine, with simultaneous occurrence of refrigeration requirement and corresponding encountering or yield of heat energy, the absorption refrigeration machine operates in the following manner:

The expeller 1, supplied for instance with heating steam, has a heating steam supply line 2 and a condensate discharge line 3, and, by way of a pipe or conduit 4 leaving from above, is connected to the separating column 5 located above the expeller 1. The refrigeration medium-steam flows from the pipe or conduit 4 on the one hand in the direction of the arrow 6 from the expeller 1 into the separating column 5, and on the other hand, in the direction of the arrow 7, rich refrigeration medium-solution flows from the separating column 5 into the expeller 1. Warm, weak refrigeration medium-solution flows in the direction of the arrow through one pipe or conduit 8 from the expeller 1 into a solution heat exchanger 9 in which the warm, weak refrigeration medium-solution is cooled with the aid of cold, rich refrigeration medium-solution. The cooled, weak refrigeration medium-solution comes through the one conduit or pipe 10 and three valves located in this conduit, in particular an automatic expansion or relief valve 11, a distributor valve 12 and a distributor valve 13, and arrives expanded or relieved in the absorber 14, which is cooled with cooling water and has a cooling water feed line 15 and a cooling water discharge line 16. The cold, rich refrigeration medium-solution discharging from the absorber through the conduit or pipe 17 flows through the storage means 18 for the rich refrigeration medium-solution (FIG. 5), or is conveyed with the aid of a pump 19 through a storage means 20 for rich refrigeration medium-solution (FIG. 6), and is pumped with the aid of a solution pump 21 through the solution heat exchanger 9 and further laterally into the separation column 5. The refrigerating medium-steam or vapor discharged or driven out in the expeller 1 and refined in the separating column 5 discharges through a pipe or conduit 22 at the head of the separating column 5 and is liquefied in the condenser 22 which is cooled with cooling water and has a cooling water supply line 24 and a cooling water discharge line 25; the refrigerating medium-fluid departs from the condenser 23 through a pipe or conduit 26, flows through a storage means 27 for refrigeration medium-fluid, and is expanded or relieved by way of the expansion or relief valve 28 in the vaporizer 29, into which warmer refrigeration carrier for vaporizing the refrigeration medium-fluid flows through a supply line 30 and flows away through a discharge line 31. The refrigeration medium steam or vapor discharging through a pipe or conduit 32 above from the vaporizer 29 is absorbed in the absorber 14, where the enriched or rich refrigeration medium-solution results as a mixture with the weak refrigeration medium-solution.

For carrying out the invention, the storage means 33, 20 for the weak refrigeration medium-solution is arranged in the bypass pipe or conduit 34 in connection with the distributor valves 12 and 13, while the existing storage means 27 for the refrigeration medium fluid, and the existing storage means 18, 20 for the rich refrigeration medium-solution, are enlarged.

The refrigeration medium liquefied and driven out during the heating period without refrigeration generation is stored in the storage means 27. The weak refrigeration medium-solution is expanded or relieved to the absorber pressure, after the cooling in the solution heat exchanger 9, in the automatic relief valve 11 and not in the absorber 14 but rather is fed by way of the distributor valve 12 into the storage means 33, 20. The supply or stored quantity of rich refrigeration medium-solution in the storage means 18, 20 must be sufficiently large in order to supply the solution circuit with rich refrigeration medium-solution during the entire heat period.

During the cooling period without yield of heat energy, the weak refrigerating medium-solution is fed from the storage means 33, 20 by way of the distributor valve 13 into the absorber 14; the weak refrigeration medium-solution enriches itself with refrigeration medium and collects in the storage means 18, 20. Simultaneously the refrigeration medium-fluid is expanded or relieved in the vaporizer 29 from the storage means 27 by way of the automatic relief or expansion valve 28, and the resulting refrigeration medium-steam or vapor is absorbed in the absorber 14.

During refrigeration requirement with excess of existing or available heat energy, the distributor valves 12, 13 are automatically so controlled that only the quantity of weak refrigeration medium-solution necessary for the refrigeration requirement is guided or conducted into the absorber 14; the excess part, however, is collected in the storage means 33, 20.

The storage volume of the weak and rich refrigeration medium-solution, and accordingly the size of the storage means necessary therefor, is reduced in accordance with the present invention. The volume of weak refrigeration medium-solution is reduced thereby that refrigeration medium concentration of the weak solution is reduced further during the heating period, as this is necessary with the given operational conditions and requirements—vaporizing temperature and cooling water temperature. Under these circumstances, the final temperature of the solution in the expeller 1 increases and the heat relationship worsens somewhat. This method is always applicable when an excess of waste heat exists or is available as heat energy and simultaneously the waste heat temperature is sufficiently high. During the cooling period, the automatic control takes care of the maintenance of the desired vaporizing temperature.

The storage means 33 for the weak refrigeration medium-solution is full, empty or partially filled respectively according to the loading condition of the storage means. The same is true for the storage means 18 for the rich refrigeration medium-solution; in particular, the storage means 18 is empty except for a minimum supply when the storage means 33 is full, and vice versa, when the storage means 33 is empty, the storage means 18 is full. The storage capacity of both containers together must accordingly be at least twice as large as the storage volume of the refrigeration medium-solution (FIG. 5).

Both storage means 33 and 18 of FIG. 5 are unified into a single storage means 20 according to FIG. 6 and in accordance with the teaching of the present invention; the single storage means 20 is then always substantially filled. This is possible since the pressures are equal, the temperatures differ only slightly from each other, though corresponding to the different concentrations considerable differences in the mass density exist. Moreover, the inclination is nominal for mixing. In the upper part of the storage means 20 is stored the rich refrigeration medium-solution, and in the lower part of the storage means 20 is stored the weak refrigeration medium-solution. The proportions of weak and rich refrigeration medium solutions then shift the concentration limit according to the loading condition.

For clarification of the extreme filling conditions in all of the storage means 27, 33, 18 and 20, these are set forth for the situation of solely the yield of heat energy without refrigeration requirement with a for the beginning of the heating period and b for the end of the heating period which are the actual filling levels for the storage means 27, 33 and 18, and for the storage means 20 in FIG. 6 are the position of the separating layer between the weak and rich refrigeration medium-solution.

The present invention is, of course, in no way restricted to the specific disclosure of the specification and drawings, but also encompasses any modifications within the scope of the appended claims.

What I claim is:

1. An absorption refrigerating machine, utilizing a refrigeration medium, for operation with refrigeration requirement and heat energy yield at any time relationshp therebetween, and machine comprising:
   a condenser for liquefying refrigeration medium vapor;
   first storage means, in communication with and located after said condenser in the direction of flow of refrigeration medium, for storing refrigeration medium-fluid;
   a solution heat exchanger;
   a continuous conduit in communication with and located after said heat exchanger in the direction of flow of refrigeration medium solution;
   a bypass conduit operatively communicable with said continuous conduit by means of a first and second distributor valve, said first distributor valve being closer to said heat exchanger in the direction of flow of refrigeration medium solution;
   second storage means arranged in and in communication with said bypass conduit for storing weak refrigeration medium-solution;
   an absorber operatively communicable with said continuous conduit and said first storage means; and
   third storage means in communication with, and located in the direction of flow after, said absorber for storing rich refrigeration medium-solution.

2. An absorption refrigerating machine according to claim 1, which includes an automatic expansion valve interposed between and in commuication with said first storage means and said absorber, and in which, during heating energy yield and in the absence of refrigeration requirement, said expansion valve is adapted to be open, said first distributor valve is adapted to be open to provide communication from said continuous conduit to said bypass conduit, and said second distributor valve is adapted to be closed to prevent communication from said second storage means to said continous conduit and further to said absorber.

3. An absorption refrigerating machine according to claim 1, which includes an automatic expansion valve interposed between and in communication with said first storage means and said absorber, and in which, during refrigeration requirement and in the absence of heating energy yield, said expansion valve is adapted to be open, said sacond distributor valve is adapted to be open to provide communication from said second storage means through said bypass conduit to said continuous conduit and into said absorber, and said first distributor valve is adapted to be closed to prevent communication from said heat exchanger to said continuous conduit and said bypass conduit.

4. An absorption refrigerating machine according to claim 1, which includes an automatic expansion valve interposed between and in communication with said first storage means and said absorber, and in which, to cover load peaks of refrigeration requirement with a uniform supply of heat energy and with said first and second storage means filled, said expansion valve is adapted to be open, said first and second distributor valves are adapted to be open to provide communication from said heat exchanger through said continuous conduit to said absorber, and from said heat exchanger through said continuous conduit to said bypass conduit through said second storage means and further to said absorber.

5. An absorption refrigerating machine according to claim 1, which includes an automatic expansion valve interposed between and in communication with said first storage means and said absorber, and in which, during refrigeration requirement and simultaneous excessive heat energy yield with said first and second storage means partially filled, said expansion valve is adapted to be open, said first and second distributor valves are adapted to be open to provide communication from said heat exchanger through said continuous conduit to said absorber, said first distributor valve is adapted to be open to provide communication from said heat exchanger through said continuous conduit to said bypass conduit, and said second distributor valve is adapted to be closed to prevent communication from said second storage means to said continuous conduit and further to said absorber.

6. An absorption refrigerating machine according to claim 2, which includes an expeller interposed between and adapted to operatively communicate with said heat exchanger and said condenser, and in which, during increased supply of heat energy to said expeller, said automatic expansion valve is adapted to be closed to prevent communication from said first storage means to said absorber, said first distributor valve is adapted to be open to provide communication from said heat exchanger through said continuous conduit to said bypass conduit, and said second distributor valve is adapted to be closed to prevent communication from said second storage means to said continuous conduit and further to said absorber.

7. An absorption refrigerating machine according to claim 1, which includes a pump in communication with, and located in the direction of flow after, said absorber, and a solution pump located in the direction of flow after said first mentioned pump and adapted to be in communication therewith by means of a conduit, and in which said second and third storage means are a single storage unit for storing weak and rich refrigeration medium-solution, said storage unit providing on one hand a connection in said bypass conduit from said first distributor valve to said second distributor valve for specifically heavy weak refrigeration medium-solution, and on the other hand providing a connection in said last mentioned conduit from said first mentioned pump to said solution pump for specifically light rich refrigeration medium-solution.

* * * * *